Figure 1:
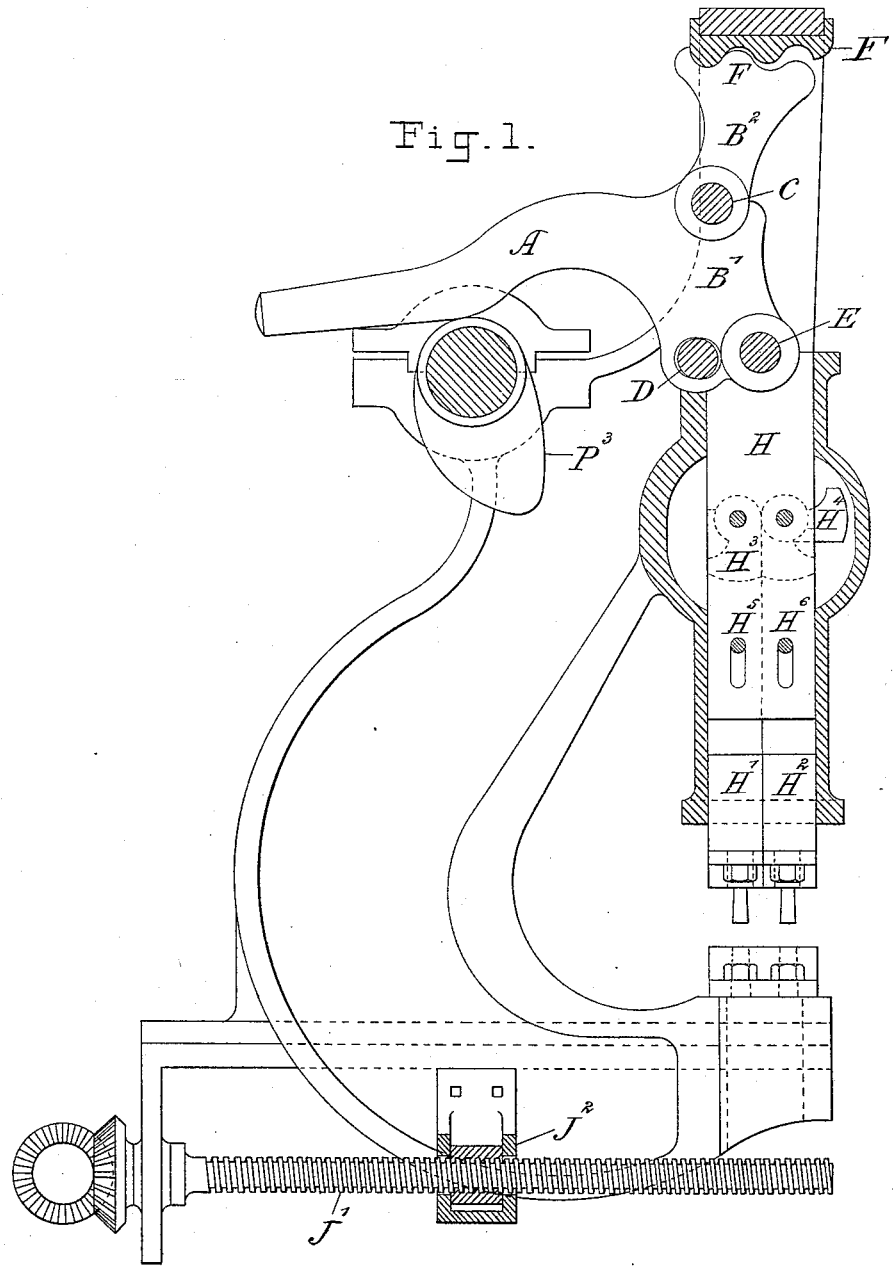

(No Model.) 6 Sheets—Sheet 1.

T. SNAITH.
PUNCHING, SHEARING, &c., MACHINE.

No. 486,387. Patented Nov. 15, 1892.

Witnesses:
John Q. Wilson
Percy C. Bowen

Inventor:
Thomas Snaith
By Whitman & Wilkinson
Attorneys.

(No Model.)   6 Sheets—Sheet 2.

T. SNAITH.
PUNCHING, SHEARING, &c., MACHINE.

No. 486,387.   Patented Nov. 15, 1892.

Witnesses:
John C. Wilson
Percy C. Bowen

Inventor;
Thomas Snaith
By Whitman & Wilkinson
Attorneys.

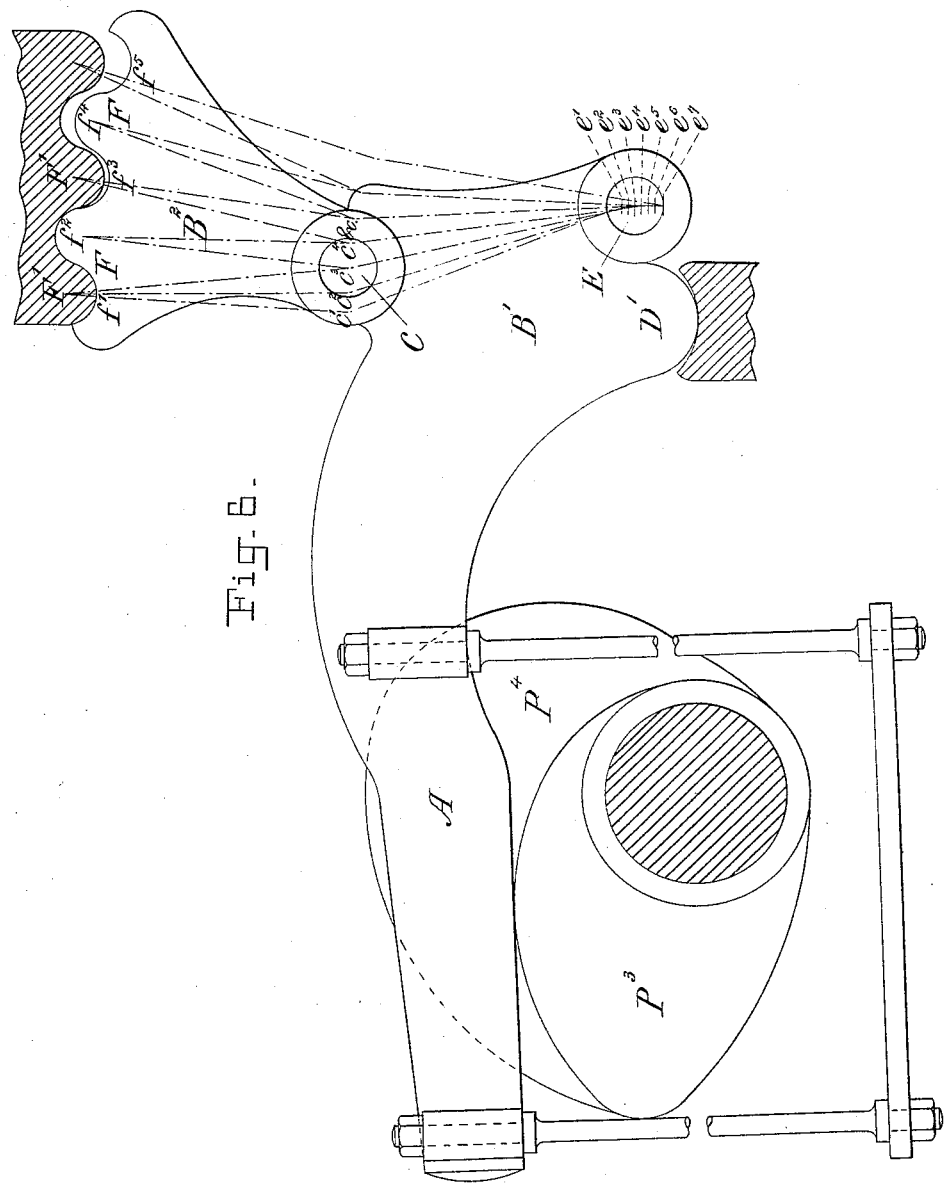

(No Model.) 6 Sheets—Sheet 4.

T. SNAITH.
PUNCHING, SHEARING, &c., MACHINE.

No. 486,387. Patented Nov. 15, 1892.

Witnesses:
John C. Welson
Percy C. Bowen

Inventor:
Thomas Snaith,
By Whitman & Wilkinson,
Attorneys.

(No Model.) 6 Sheets—Sheet 5.
T. SNAITH.
PUNCHING, SHEARING, &c., MACHINE.
No. 486,387. Patented Nov. 15, 1892.
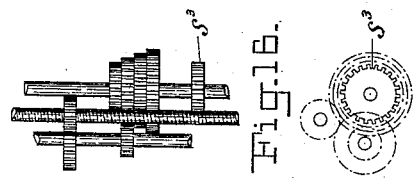
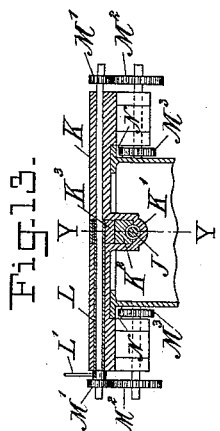
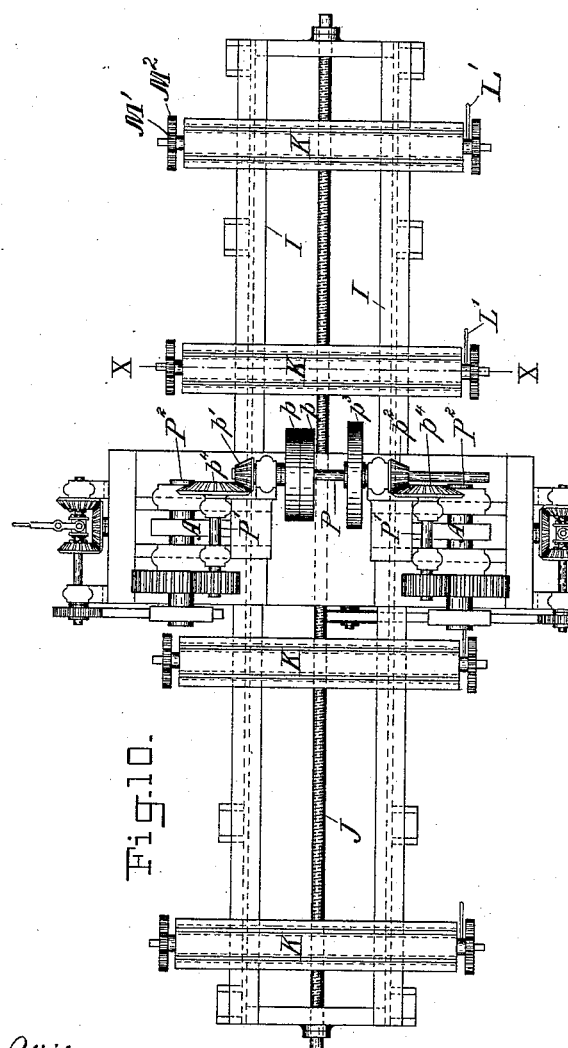
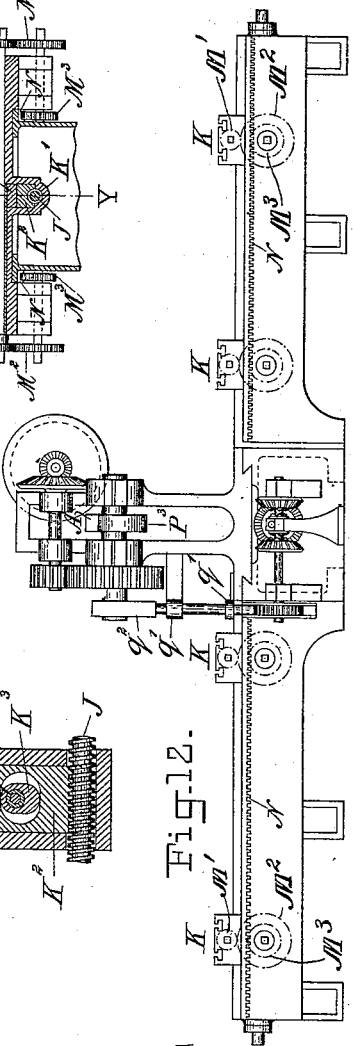

(No Model.) 6 Sheets—Sheet 6.
T. SNAITH.
PUNCHING, SHEARING, &c., MACHINE.

No. 486,387. Patented Nov. 15, 1892.

Witnesses
Percy C. Bowen
John C. Wilson

Inventor
Thomas Snaith,
by Whitman & Wilkinson
Attorneys

UNITED STATES PATENT OFFICE.

THOMAS SNAITH, OF SOUTH STOCKTON, ENGLAND.

PUNCHING, SHEARING, &c., MACHINE.

SPECIFICATION forming part of Letters Patent No. 486,387, dated November 15, 1892.

Application filed June 22, 1892. Serial No. 437,617. (No model.) Patented in England September 4, 1890, No. 13,866; in France August 14, 1891, No. 215,532, and in Germany August 28, 1891, No. 12,975.

*To all whom it may concern:*

Be it known that I, THOMAS SNAITH, a subject of the Queen of Great Britain, residing at South Stockton-on-Tees, in the county of York, England, have invented certain new and useful Improvements in or Applicable to Punching, Shearing, Riveting, Pressing, or the like Machinery, in which great power is concentrated upon the operating tool or appliance, (for which I have obtained patents in Great Britain, No. 13,866, bearing date September 4, 1890; in France, No. 215,532, bearing date August 14, 1891, and in Germany, No. 12,975, dated August 28, 1891;) and I do hereby declare the following to be a full, clear, and exact description of the invention, such as will enable others skilled in the art to which it appertains to make and use the same.

My invention relates to that class of machines for punching, shearing, and riveting together metal plates, or pressing, in which intense pressure is applied with a slow motion to the operating tool or appliance.

My invention effects improvements in those parts of machines of this class from which the intense pressure which is to be exerted on the operating tool or appliance—such as the punch, shearing-blade, or follower-plate—is derived; and it consists in the particular combination of parts by which a more effective application of power is obtained in the leverage mechanism.

My invention also comprises several improvements in detail of construction which are more especially applicable to punching-machines by which a transverse automatic feed or self-acting motion can be applied to the frames or standards for carrying the punching mechanism simultaneously with an automatic lateral feed or self-acting motion of plate under treatment and by which plates with tapered or curved edges can be punched to any required pitch with the same facility as plates with parallel edges which require a lateral feed only.

That part of my invention which relates to the leverage mechanism consists of improvements in applying what is known as the "lever-and-toggle motion," and is applicable with advantage to various machines, such as punching and shearing machines, in which the maximum of power is required early in the stroke, and riveting-machines, in which the maximum of power is required toward the end of the stroke. In the ordinary lever-and-toggle motion two links are hinged together by a pin or knuckle joint, one of which turns upon a fixed center and the other upon a movable center, the power being obtained by opening out the angle between the links. Consequently the motion or travel of the operating tool or appliance is greatest and the leverage is weakest at the commencement of the operation in hand, which leverage only attains to its full power as the tool operated by it reaches the limit of its stroke. This is found to be an unfavorable feature in the leverage mechanism in question and is due to a too-great variation in the angle between the three principal points of resistance as the operating tool or appliance is making its stroke, which points of resistance in ordinary toggles are the said centers upon which the links turn and the connecting-pin or knuckle-joint between them.

An important feature of my invention consists in combining the parts constituting the leverage mechanism in a manner which admits of a controllable variation in the angle representing the positions of the said points of resistance, which combination of parts admits of considerable modification without departing from the nature of my invention.

In order that my said invention and the manner of performing the same may be clearly understood and carried into effect, I hereunto append drawings illustrating various modifications of my improved leverage mechanism, in combination with machines of certain kinds to which it is considered advantageously applicable. I also append a sheet of drawings for the purpose of illustrating more particularly the self-feeding and other devices as constructed and arranged in accordance with my invention for punching both edges of a plate simultaneously, whether the edges are parallel, tapered, or curved.

In the drawings the same letters of reference indicate the same or corresponding parts in all the figures.

Figure 2:
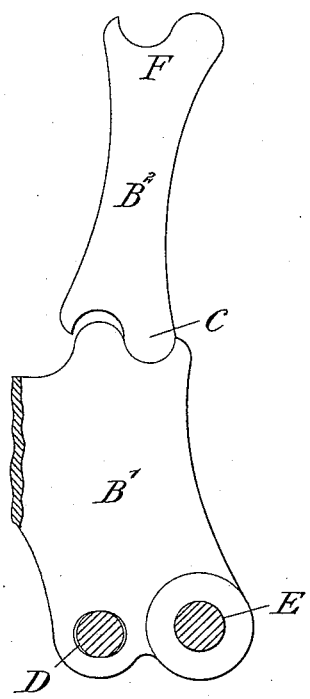
Figure 3:
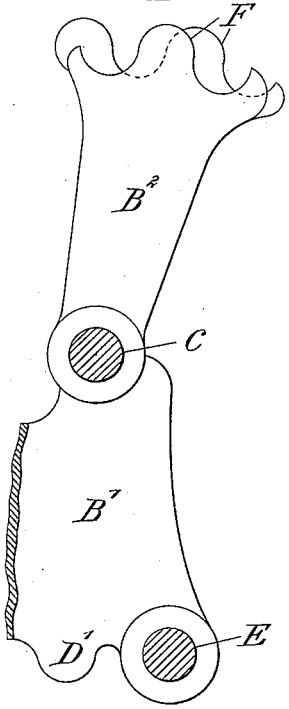
Figure 5:
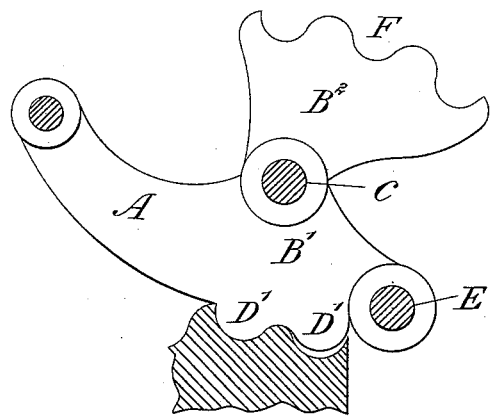
Figure 4:
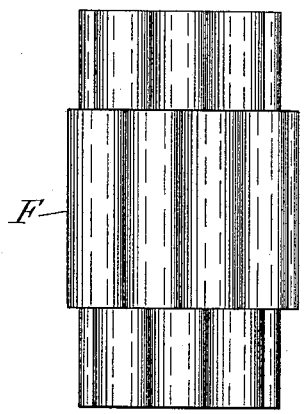

Figure 1 illustrates my improved lever-andtoggle motion fitted up in combination with the operating mechanism of a punching-machine. Figs. 2, 3, and 5 are modifications of the same lever-and-toggle motion illustrated in detail to a larger scale; and Fig. 4 illustrates in plan the head of a toggle-lever with an alternate arrangement of toggles to divide the pitch. Fig. 6 is drawn to illustrate by diagram the amount of variation in the angle representing the positions of the points of resistance in the lever-and-toggle motion corresponding to the motion of the operating-tool when constructed and applied according to my invention and in what way this said variation is controllable. It is essential that this part of my invention should be clearly understood, as the mechanical principle involved applies to all the modifications of my improved leverage mechanism, as illustrated by way of example and hereinafter described.

In Fig. 6 an arm or lever A operates the links or toggle-levers B′ B², which are hinged together at the pin or knuckle joint C. It will be observed that the arm A extends from and forms part of the lower toggle-lever B′ in the form of a lever of the first order, which works on a fulcrum D′, provided in the frame of the machine near to the joint or pin E, which is a joint or hinge connecting the leverage mechanism with the punching or other operating tool. The leverage mechanism may be put in motion by the action of a cam or other suitable means. The upper lever B² is furnished with a corrugated head, forming what I term "toggle-teeth" F, which engage with or fit into other toggle-teeth F′, which are similarly formed and secured to the frame of the machine. Taking $f′ f² f³ f⁴ f⁵$ as a series of successive points of resistance of the lever B², when the lever mechanism is set in motion with $c′ c² c³$, &c., and $e′ e² e³$, &c., as the corresponding position of the pins C and E, respectively, it will be observed that the angle representing the relative positions of the three points of resistance will take its form from the manner in which the point of resistance along the toggle-teeth F F′ advances relatively to the pin C. Consequently the substitution of toggle-teeth for a fixed pin for the lever B² to work on affords a means for controlling the pressure exerted on the operating-tool, which pressure may be uniform or variable in any manner required by adjusting the pitch or construction of the toggle-teeth accordingly.

In Fig. 6, as shown by the dotted lines, the toggle-teeth are constructed in pitch and motion to afford only a slight variation in the angle representing the points of resistance, and consequently an equally-slight variation in the power of the leverage, as motion is imparted to the operating-tool or in its rate of motion relatively to the leverage mechanism. When the points of resistance in the toggle-teeth advance more slowly than the pin C, the power of the leverage on the operating-tool increases, and similarly when the said points of resistance advance more quickly than the pin C the power of the leverage on the operating-tool decreases.

My improved leverage mechanism may be modified without departing from this essential feature in its operation so long as the upper toggle-arm advances on toggle-teeth instead of swinging about a fixed center—as, for instance, as illustrated in Fig. 2, in which the upper toggle-arm B² is corrugated at both ends and fits into corresponding corrugations in the lower toggle-arm B′, as well as in the frame-head.

In Figs. 3 and 4 a finer pitch of the toggle-teeth is obtained without reduction in strength of the parts in contact by constructing the toggle-teeth at the center to alternate with similarly-pitched toggle-teeth at each side in a manner which is sufficiently clear from Figs. 3 and 4 to require no further description.

The motion of the operating tool or appliance in machines of the class to which my invention more especially refers is strictly limited to a straight line, which usually takes the direction of a vertical stroke. Consequently when the lever B′ works upon a fulcrum D provision must be made for the said lever to work about its fulcrum without tendency to produce any curvature in the motion of the pin or joint E. This I propose to effect by providing a loose fit of the lever B′ about the pin D or about the knuckle D′, or by providing a double-knuckle fulcrum D′ D′ and sockets, so that the point of contact upon which the lever works can advance or recede from one socket to the other, as illustrated in detail in Fig. 5.

From the foregoing description, taken in connection with the accompanying drawings, it will be seen that I have provided a simple, compactly-arranged, and powerful leverage mechanism, which can be easily combined with the operating-tools of punching and various other machines, examples of which are illustrated in the drawings, and which I will now proceed to describe.

In Fig. 1, which illustrates a standard of a punching-machine embodying my other improvements and which will be more fully described hereinafter, my lever-and-toggle motion is combined with the operating parts of the punching-machine, which operating parts consist in this case of the upper punch-slide H, lower punch-slides H′ H², each of which controls a punch, the usual tumblers H³ H⁴ for putting the punches in or out of action independently of the driving motion, and the retaining-pins H⁵ H⁶, all combined and operating together in the usual or any suitable manner.

Figure 7:
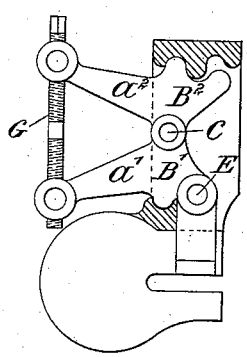

Fig. 7 illustrates my improved leverage mechanism as part of a hand-power punch, in which both the toggle-bars B′ B² are provided with lever-arms $a′ a²$, to which power is applied by turning a right and left hand screw G in the manner shown.

Figure 8:
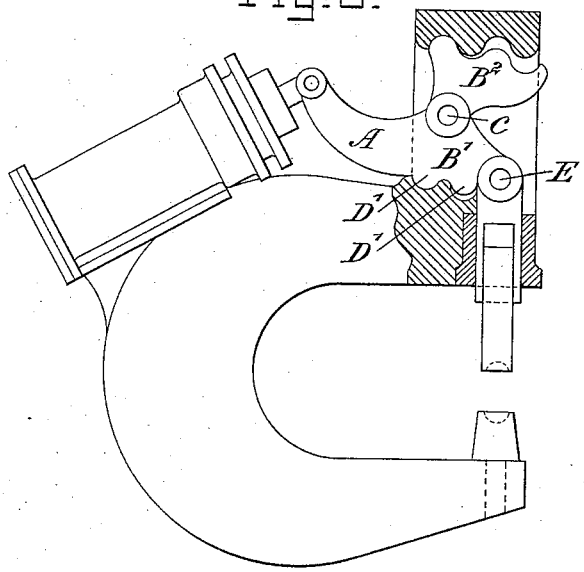
Figure 9:
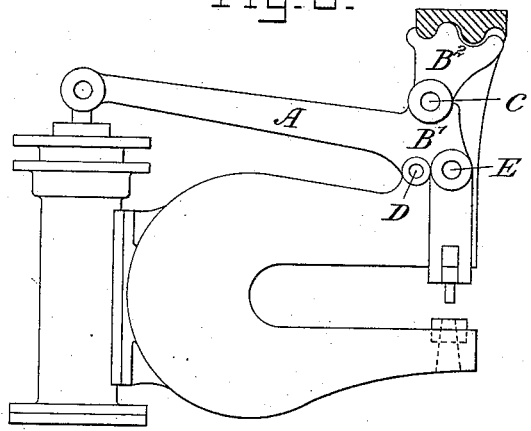

Figs. 8 and 9 illustrate my improved leverage mechanism as forming part of portable riveting and punching machines, respectively, to be driven by water or air by connecting the lever-arm A direct to the piston-rod of the cylinder. Where the stroke of the operating-tool is considerable, as in the case of a riveting-machine, I provide a double-knuckle fulcrum D' D' for the said lever to work upon, as illustrated in Fig. 8, and where the stroke of the operating-tool is short, as in a punching-machine, the arm A works upon a knuckle of a loose-fitting fulcrum-pin D, as illustrated in Figs. 1 and 9.

I will now proceed to describe my improvements in those details of construction in punching-machines by which an automatic transverse feed or self-acting motion is applied to the frames or standards which carry the punching mechanism simultaneously with an automatic lateral feed or self-acting motion of the plate under treatment, by which plates with tapered or curved edges can be punched with the same facility as plates with parallel edges, which of course require a lateral feed only.

Figure 11:
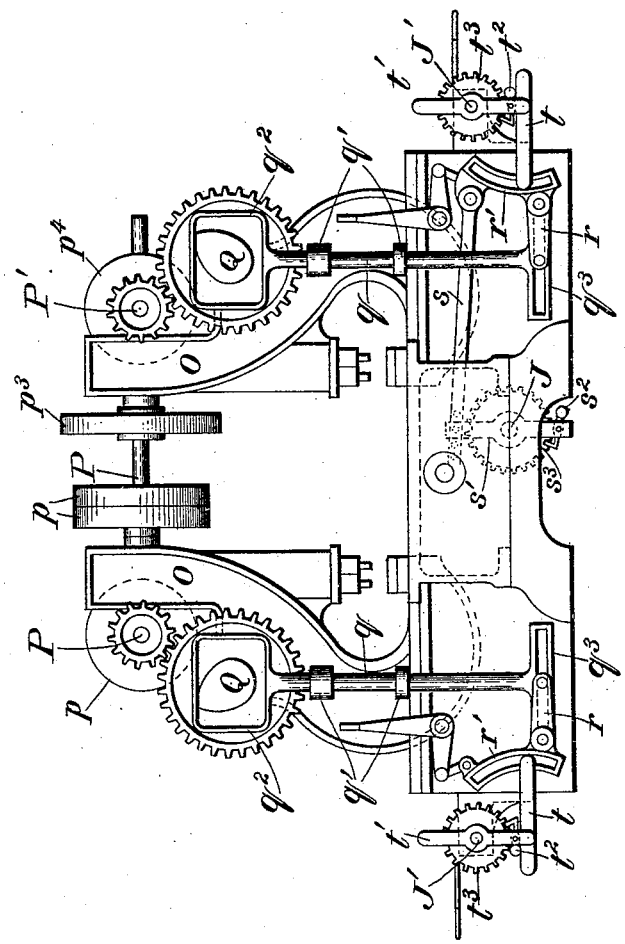

The following is a general description of a punching-machine which is complete in all its parts and which combines with my improved leverage mechanism and my other improvements for applying a transverse and lateral feed simultaneously, other features which are not novel in themselves may be constructed or fitted together in any manner suitable for the purposes of my invention, a convenient arrangement being shown in the drawings and hereinafter described for the purpose of enabling my invention and the manner of carrying it into effect to be clearly understood. In the sheet of drawings appended to illustrate this part of my invention, Fig. 10 illustrates in plan a punching-machine embodying all my improvements. Figs. 11 and 12 are corresponding end and side views, respectively. Fig. 13 is a sectional view taken on line X X of Fig. 10, and Fig. 14 is an enlarged sectional view taken on line Y Y of Fig. 13. Figs. 15 and 16 are detailed views of the feed-motion and its connections with the motion-shafts.

The rectangular bed-plate I has a screw-shaft J underneath extending the full length thereof. The screw-shaft J passes through boxes K', which extend downward and form part of the cross-rest K. Each of these boxes K' is furnished with a half-nut $K^2$, which is controlled in its position by a cam $K^3$, which puts it in or out of contact with the screw-shaft J by means of a hollow shaft L, with which the eccentric $K^3$ is a fixture, and the lever-handle L' for turning same. The function of this contrivance is to apply a lateral feed to the plate to be punched by screwing the cross-rests K along the bed-plate I. The cross-rests K are separately adjustable in position on the bed-plate I by means of the pinions and spur-wheels M' $M^2$ $M^3$, of which $M^3$ gears into the rack N, which runs along either side of the bed-plate I, as shown in Fig. 12. A transverse feed is applied to the turn-frames or standards O by means of the screw-shafts J' and suitable screw-boxes. (Not shown, but preferably constructed like the screw-boxes shown in Figs. 13 and 14.) These standards or frames carry the punching mechanism and motion-shafts. A first-motion shaft P, with fast and loose pulleys $p$, bevel-pinions $p'$ $p^2$, and fly-wheel $p^3$, all of which are clearly shown in position in Fig. 10, drives the second-motion shafts P' by gearing the bevel-wheels $p^4$ into the bevel-pinions $p'p^2$. Each second-motion shaft P' is geared into a third-motion or cam-shaft $P^2$, which operates the punching mechanism by rotating the cam $P^3$, the said cam engaging the end of a toggle-lever A, constructed according to my invention, but the details of which, being shown in detail in Fig. 1, are omitted from Figs 10, 11, and 12 for the sake of clearness in the drawings. The return motion of the lever A may be controlled by a return-motion cam $P^4$, working in a frame attached to the lever A in the manner shown in Fig. 6, but omitted for clearness in Fig. 1. It must, however, be understood that any suitable mode of controlling the said return motion of the lever may be used. It is essential that the first-motion shaft P keep in gear with the second-motion shaft P' as they move in and out with the twin frames O, upon which they are mounted. To effect this, one of the bevel-pinions $p^2$ is furnished with a long boss or sleeve extending through the shaft-bearing far enough to key the fly-wheel to same, the said pinion having also a feather-key which works in a groove in the shaft P, so that the said pinion can slide along its shaft, but both must rotate together. By means of a cam Q at the end of each motion-shaft $P^2$, connected and operating with the usual arrangemnt of sliding bars, levers, pawls, and ratchet-wheels, the rotary motion of the third-motion shafts $P^2$ can be made available for simultaneously applying a lateral feed to the plate or the cross-rest and a transverse feed to either or both of the twin frames O. Suitable mechanism to effect this is shown in the drawings and consists of sliding bars $q$, working in guides $q'$ on the frames. Each sliding bar $q$ is furnished at the upper end with an open head-piece $q^2$ to embrace the cam Q and at the lower end with a slotted link $q^3$, by which it is connected, slot-and-pin fashion, with a bell-crank lever $r$, one arm of which is in the form of a radius link or quadrant $r'$. The combined action of the bar $s$, lever $s'$, and pawl $s^2$ communicate the vibrations of the bell-crank lever $r$ to the ratchet-wheel $s^3$ in the well-known form of applying an intermittent feed to the screw-shaft J, provision being made to graduate the speed of the feed motion by motion-shafts on sliding carriages and gearing of the kind illustrated in Figs. 15 and 16, which is too well known to require description. Similarly the combined action of the bar $t$, lever $t'$, and pawl $t^2$ communicate the vibrations of the same bell-crank lever $r$ to the ratchet-wheel $t^3$ and apply an intermittent feed to the screw-shafts $J'$, provision being made to graduate the speed by adjusting the point of connection of the bar $t$ with the quadrant $r'$. The direction in which each feed is applied will be reversible by reversing the pawls $s^2 t^2$, or in the case of the transverse feed the well-known clutch-and-double-pinion arrangement may be used, as shown in Figs. 10 and 12.

It must be understood that I attach no special importance to the particular arrangement of those parts which are not novel in themselves, as they are capable of many modifications by which they are adapted to various machines and have been described by way of illustrating a convenient manner of using them in combination with and for the purposes of my invention.

Having now described my invention, what I claim as new, and desire to secure by Letters Patent, is—

1. In a machine for punching, shearing, riveting, &c., in which intense pressure is to be exerted on the operating tool or appliance, the combination, with a frame provided with toggle-teeth, of a toggle-lever mounted between fixed bearings on said frame and having a projection on one arm connected to the tool to be operated and the other arm corrugated and adapted to advance on toggle-teeth fixed in said frame, with means for exerting pressure on the pivot of said toggle-lever, substantially as and for the purposes described.

2. In a machine for punching, shearing, riveting, &c., in which intense pressure is to be exerted upon the operating tool or appliance, the combination, with a frame provided with toggle-teeth and an operating-tool, of a toggle-lever mounted between fixed bearings on said frame, the said toggle-lever consisting, essentially, of two arms, one arm being pivoted in said frame and having a projection thereon to which the operating-tool is attached and the other arm being corrugated and adapted to advance on toggle-teeth fixed in said frame, with means for exerting pressure upon the pivot of said toggle-lever, substantially as and for the purposes described.

3. In a machine for punching, shearing, riveting, &c., in which intense pressure is to be exerted upon the operating tool or appliance, the combination, with a frame provided with toggle-teeth and an operating-tool, of a toggle-lever mounted between fixed bearings on said frame, the said toggle-lever consisting, essentially, of two arms pivoted together, the one arm being pivoted in said frame and having a small freedom of transverse movement relative to said pivot and having a projection thereon to which the operating-tool is attached and the other arm being corrugated and adapted to advance on toggle-teeth fixed in said frame, with means for exerting pressure upon the pivot of said toggle-lever, substantially as and for the purposes described.

4. In a machine for punching, shearing, riveting, &c., in which intense pressure is to be exerted upon the operating tool or appliance, the combination, with a frame provided with toggle-teeth and an operating-tool, of a toggle-lever mounted between fixed bearings on said frame, the said toggle-lever consisting, essentially, of two arms, the one arm being pivoted in said frame and having a projection thereon to which the operating-tool is attached and the other arm being corrugated and adapted to advance on toggle-teeth fixed in said frame, and a lever connected to one of said arms, with means for moving said lever and so exerting pressure upon the pivot of said toggle-lever, substantially as and for the purposes described.

5. In a machine for punching, shearing, riveting, &c., in which intense pressure is to be exerted upon the operating tool or appliance, the combination, with a frame provided with toggle-teeth and an operating-tool, of a toggle-lever mounted between fixed bearings on said frame, the said toggle-lever consisting, essentially, of two arms pivoted together, the one arm being pivoted in said frame and having a small freedom of transverse movement relative to said pivot and having a projection thereon to which the operating-tool is attached and the other arm being corrugated and adapted to advance on toggle-teeth fixed in said frame, and a lever connected to one of said arms, with means for moving said lever and so exerting pressure upon the pivot of said toggle-lever, substantially as and for the purposes described.

6. In a machine for punching, shearing, riveting, &c., in which intense pressure is to be exerted upon the operating tool or appliance, the combination, with the frame provided with toggle-teeth and an operating-tool, of a toggle-lever mounted between fixed bearings on said frame, the said toggle-lever consisting, essentially, of two arms pivoted together, the one arm being pivoted in said frame and having a small freedom of transverse movement relative to said pivot and having a projection thereon to which the operating-tool is attached and the other arm having a plurality of rows of corrugations arranged side by side, the corrugations in one row lapping the corrugations in the adjacent row, and rows of toggle-teeth fixed in said frame, registering with said corrugations and adapted to engage said corrugations as the toggle-lever arm advances, substantially as and for the purposes described.

7. In a machine for punching, shearing, riveting, &c., in which intense pressure is to be exerted upon the operating tool or appliance, the combination, with a frame provided with toggle-teeth and an operating-tool, of a toggle-lever mounted between fixed bearings on said frame, the said toggle-lever consisting, essentially, of two arms pivoted together, the one arm being pivoted in said frame and having a small freedom of transverse movement relative to the said pivot and having a projection thereon to which the operating-tool is attached and the other arm having a plurality of rows of corrugations arranged side by side, the corrugations in one row lapping the corrugations in the adjacent row, rows of toggle-teeth fixed in said frame, registering with said corrugations and adapted to engage said corrugations as the toggle-lever arm advances, and a lever connected to one of said arms, with means for moving said lever and so exerting pressure upon the pivot of said toggle-lever, substantially as and for the purposes described.

In testimony whereof I affix my signature in presence of two witnesses.

THOMAS SNAITH.

Witnesses:
GEORGE J. CLARKSON,
EDWARD THOMAS ELCOAT.